United States Patent [19]

Bring

[11] 4,395,639

[45] Jul. 26, 1983

[54] UNINTERRUPTIBLE POWER SUPPLY WITH BATTERY BACK-UP

[75] Inventor: Karl-Birger Bring, Oskarshamn, Sweden

[73] Assignee: SAB NIFE Aktiebolag, Landskrona, Sweden

[21] Appl. No.: 375,568

[22] Filed: May 6, 1982

Related U.S. Application Data

[63] Continuation-in-part of Ser. No. 198,362, Oct. 20, 1980, abandoned.

[30] Foreign Application Priority Data

Oct. 30, 1979 [SE] Sweden .............................. 7909064

[51] Int. Cl.³ .............................................. H02J 7/00
[52] U.S. Cl. ...................................... 307/66; 320/13; 320/21
[58] Field of Search ...................... 307/66, 130; 320/9, 320/13, 14, 21, 39, 40, 50

[56] References Cited

U.S. PATENT DOCUMENTS

3,952,772 12/1975 Miller et al. ...................... 307/66 X
4,087,697 5/1978 Johnson .............................. 307/66

Primary Examiner—A. D. Pellinen
Assistant Examiner—James L. Dwyer
Attorney, Agent, or Firm—Murray Schaffer

[57] ABSTRACT

A charger in the form of a primary switched rectifier and transformer charges a battery and carries a load when the operating voltage is available to a sufficient extent. When a voltage drop or break in voltage automatically disconnects the battery from the charger, the load is supplied with voltage from the battery. The battery voltage is chopped into square wave form and transformed up via the secondary side of the transformer to the voltage required for the load. A diode is connected between the load and the battery allowing the battery voltage to act directly on the load as long as this voltage is sufficiently high.

5 Claims, 5 Drawing Figures

UNINTERRUPTIBLE POWER SUPPLY WITH BATTERY BACK-UP

RELATED APPLICATION

The present application is a continuation-in-part of Ser. No. 198,362 filed Oct. 20, 1980 now abondened.

BACKGROUND OF THE IVENTION

The invention relates to a method of uninterrupted operation of a current supply installation and apparatus for the method.

In such an installation, a storage battery charger is driven, which rectifies the operating voltage coming from an AC current supply or a generator, and which via a transformer transforms it to a suitable voltage for charging a battery and carrying a load. If there is a break in voltage, the load is carried by the battery. The battery voltage is thus always the same as the load voltage. Nearly always, the load has a limited voltage range, within which the ingoing voltage must be kept. Battery dimensioning is thus dependent to a great degree on the permitted voltage range of the load. The battery charger must be of the so-called constant voltage type.

In order to fully charge the battery, a certain least voltage per cell is required. The number of cells in the battery is therefore determined by the greatest permitted voltage of the load divided by this least charging voltage per cell. The lowest final cell voltage which can be tolerated, when the battery is carrying the load, will be equal to the lowest permitted load voltage divided by the number of cells in the battery.

Even with a relatively generously defined range for the load voltage, relatively high permitted final voltages per cell are often arrived at in this kind of dimensioning. A high final voltage combined with operating times, e.g. in the range of 10–60 minutes, for the battery, give poor utilization of the energy stored in the battery.

A complete current supply installation of a kind known up to now is generally constructed in the following way. An incoming AC voltage is rectified, smoothed and chopped into square wave form, e.g. in a transistor. The square wave voltage is then transformed to a suitable voltage for charging and operation, and is once again rectified to remove the square wave form, filtered and used for charging the battery and carrying the load. Regulation of the output voltage is obtained by pulse width, amplitude or frequency being varied by a control unit, which senses the output signal and regulates the square wave generator. If the incoming alternating voltage is interrupted, the load is fed directly with the voltage from the battery.

SUMMARY OF THE INVENTION

The present invention relates to a current supply installation with another method of operation, whereby the energy of the battery is better utilized. There is thus the choice of obtaining sufficient operating voltage for the load during a longer time, by retaining the same battery capacity as with previous installations, or, while maintaining the time for the lowest permitted load voltage, using a battery with lower capacity, which is thus cheaper.

The invention thus relates to a method of operation of an uninterrupted current supply installation which, via a charger in the form of a primary-switched rectifier with transformer charges a battery and carries a load when the operating voltage is available to a sufficient extent, but with a voltage drop or interruption automatically disconnects the battery from the charger and supplies the load with voltage from the battery instead. The battery voltage is here chopped into square wave form and transformed up on the secondary side of the transformer to the voltage required for the load.

A diode can be placed to advantage between the battery and load, this diode permitting battery voltage to act directly on the load during an interruption in the operating voltage, as long as the battery voltage is higher, or equal to the voltage required for the load. In this way a part of the small, but unavoidable capacity losses occuring in giving the battery voltage square form and transforming it up are avoided.

The invention also relates to a current supply installation with uninterrupted operation, in accordance with the patent claims.

BRIEF DESCRIPTION OF THE DRAWINGS

This invention will now be described in detail with the aid of the appended drawings on which.

DESCRIPTION OF THE INVENTION

Figure 1:
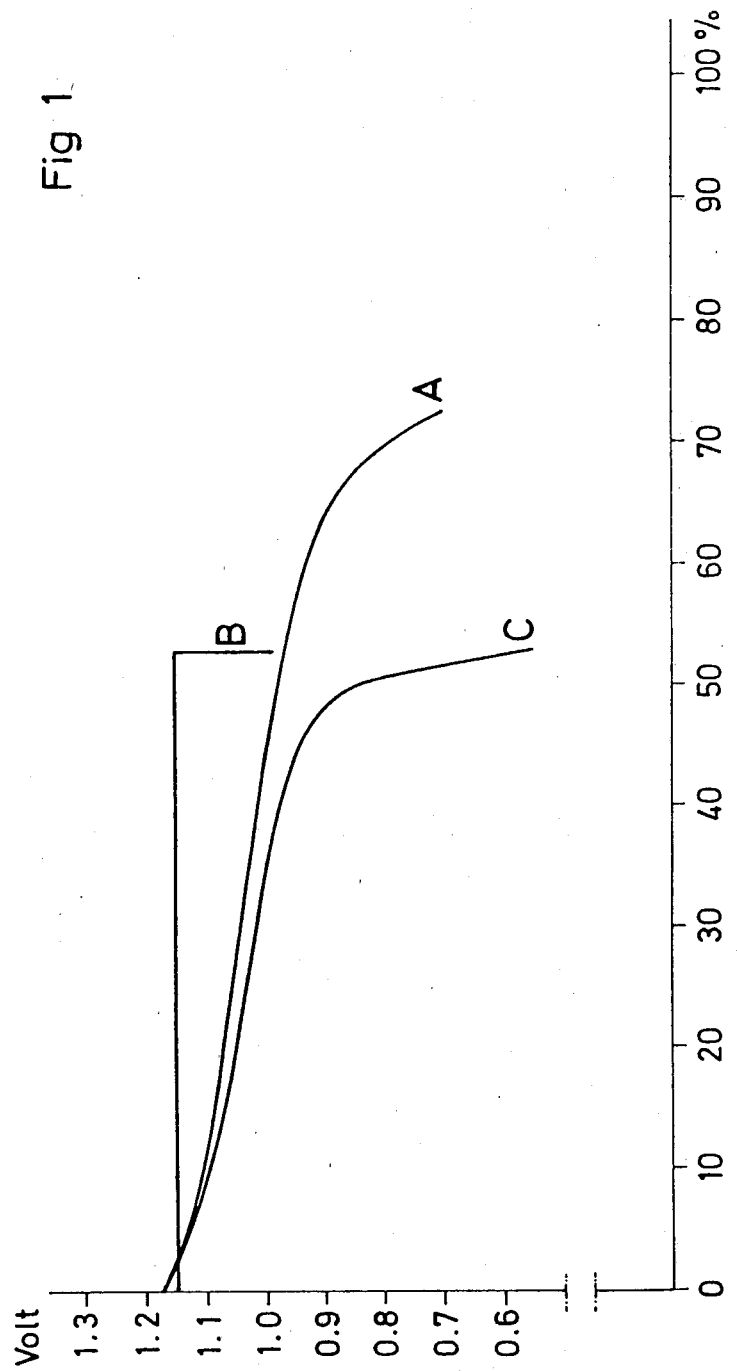
FIG. 1 illustrates voltage and capacity graphs for discharging the battery in a current supply installation with uninterrupted operation.

The graphs in FIG. 1 relates to nickel-cadium batteries, but similar conditions prevail for other battery types as well. These graphs are only selected as an arbitrary example and do not signify any restriction of the inventive concept. The graph A shows how the battery voltage falls with discharge of a battery which is loaded with 2C A, and without control means in accordance with the invention. The quantity C here denotes the nominal capacity of the battery expressed in ampere-hours for a 5-hour discharge. It is apparent from the graph that with the load 2C A it is only possible to take out 4% of the total battery capacity at the voltage of 1,14 V/cell or 11% at the voltage 1,10 V/cell, whereas it is possible to utilize 69% of the capacity if the voltage is allowed to drop to 0,8 V cell. The graph B illustrates the output voltage when using a circuiting method in accordance with the invention. The graph is plotted for a load which is to be carried at the same loading as above and a lowest voltage of 1,14 V. Instead of only being able to take out 4% of the battery capacity at this voltage, as illustrated above, 52% of the battery capacity can now be utilized at the same voltage.

The graph shows the voltage across the battery during plotting graph B. The voltage falls somewhat more quickly now, but the losses on the portion of the graph lying over 1,14 V in this example can be avoided by connecting the load directly to the battery via a diode, which will be non-conducting when the battery voltage falls below this value. That the battery voltage will be lower than according to graph A when using the circuit according to the invention as in graph C, is because the battery will be more heavily loaded, since the output voltage is higher, and also because the circuit causes some losses. In spite of this, considerable gains in the degree of utilization of the battery can be achieved.

Figure 2:
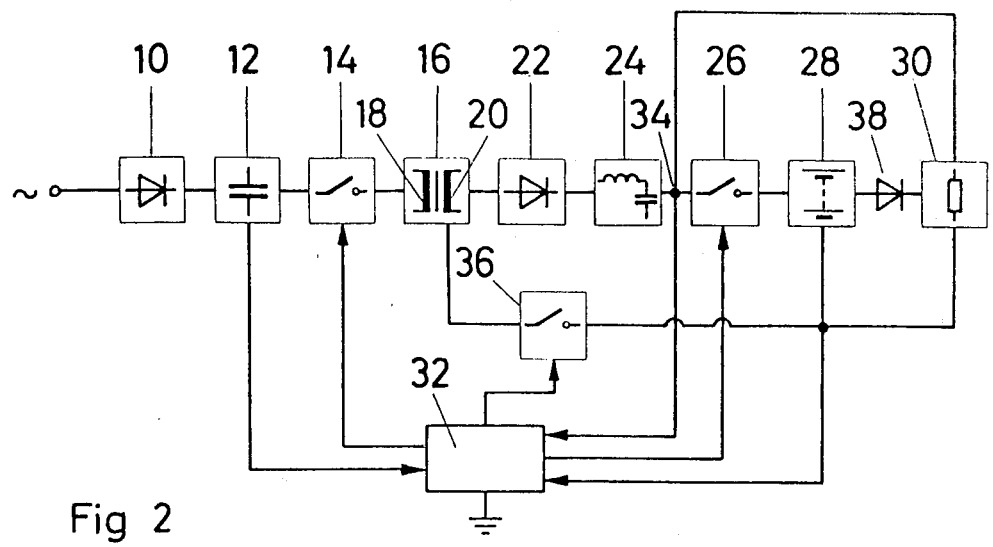
FIG. 2 is a block diagram illustrating the principle for a current supply installation in accordance with the invention.
Figure 3:
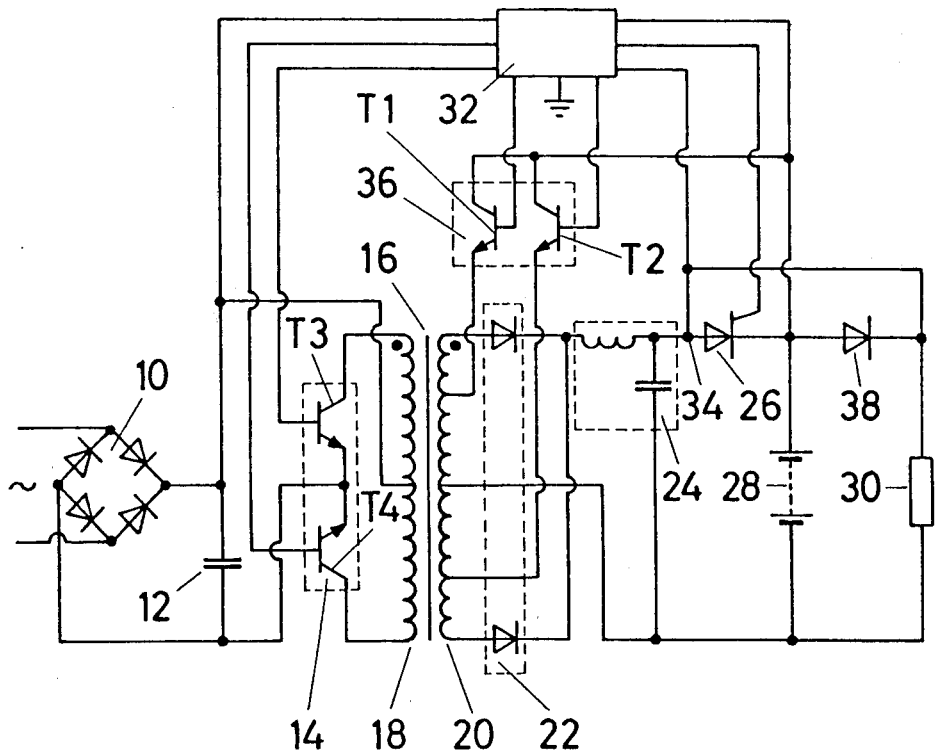
FIG. 3 is a circuit diagram for the installation in accordance with the invention.
Figure 4:
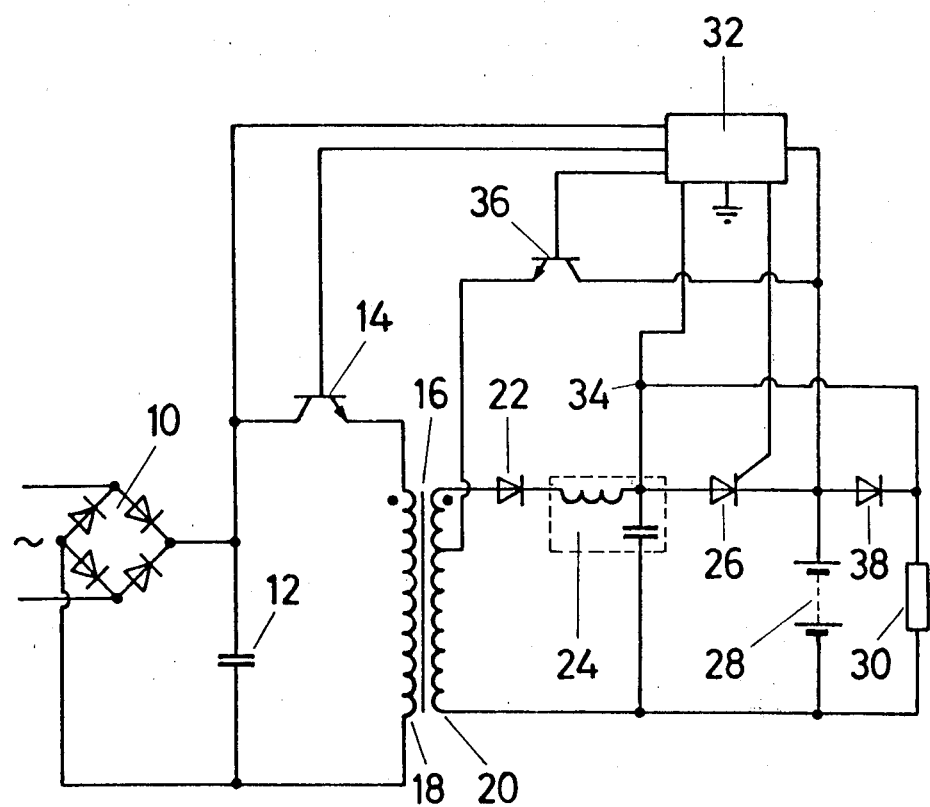
FIG. 4 is a circuit diagram for a second embodiment of the installation in accordance with the invention.

In FIGS. 2, 3 and 4 the numeral 10 denotes a rectifier, which rectifies the incoming driving voltage from an AC current supply or a generator. A smoothing filter 12 contains a capacitor and a square wave generator 14, e.g. one or more transistors in which the rectified voltage is chopped to square wave form. The chopped voltage then goes to the transformer 16 which has a primary winding 18 and at least one secondary winding 20. The transformer is preferably a ferrite core transformer. The voltage is transformed here to one suitable for charging the battery and carrying the load. The voltage is once again rectified in the rectifier 22 and filtered in a filter 24, which can comprise a choke and a capacitor to remove the square wave form of the voltage. A switch 26 suitably comprises a thyristor, which is closed as long as sufficient operating voltage is applied to the input of the rectifier 10. The battery 28 thus obtains a charging current, so that it is always kept fully charged during normal operation. The load 30 is given operating voltage at the same time. Regulation of the charging and operating voltage takes place by the pulse width, amplitude or frequency being varied with the aid of a control unit 32, which senses the output signals at the point 34 and regulates the square wave generator 14. The apparatus further contains a switch 36, which is in the open position when sufficient alternating voltage is applied to the input of the rectifier 10.

When there is sufficiernt alternating voltage, the switch 26 is in the ON position and the switch 36 in the OFF position, and the apparatus functions as an ordinary primary-switched rectifier, which charges the battery 28 and carries the load 30. When there is a voltage drop or an interruption in the alternating voltage on the input, the switch 26 goes to the OFF position, as well as the square wave generator 14, which hereby serves as a switch. The battery will thus be disconnected from the charger output. The switch 36 now serves as a square wave generator. This switch can comprise two transistors T1 and T2, for example, as illustrated in FIG. 3, T1 and T2 in turn comprising a plurality of transistors connected in parrallel. The secondary winding 20 of the transformer is provided with voltage from the battery via this square wave generator 36. The transforming ratio of the transformer between the battery input and output is so selected that transformation up to the operating voltage of the load is obtained. Energy then goes via the rectifier 22 and filter 24 to carry the load 30.

In the circuit according to FIG. 3, the square wave generator 14 comprises two transistors T3 and T4, the outputs of which are connected to the outer ends of the primary winding 18 in the transformer 16. The rectified voltage is here connected to the centre terminal on the primary winding. Saturation of the transformer is hereby avoided, and less load is also obtained on the transistors. In the same way, the square wave generator 36 also comprises two transistors, T1 and T2, which are connected to the secondary winding 20 of the transformer.

FIG. 4 illustrates a simpler circuit, where both the generator 14 and generator 36 each comprises one transistor.

A diode 38 is also indicated in the Figures. This diode is not necessary for the function of the apparatus, but can save some energy in many applications. The diode namely allows the battery voltage to directly act on the load for an interruption in the voltage from the rectifier 10, as long as the battery voltage is higher than the voltage which is obtained via the feedback to the secondary side of the transformer.

Figure 5:
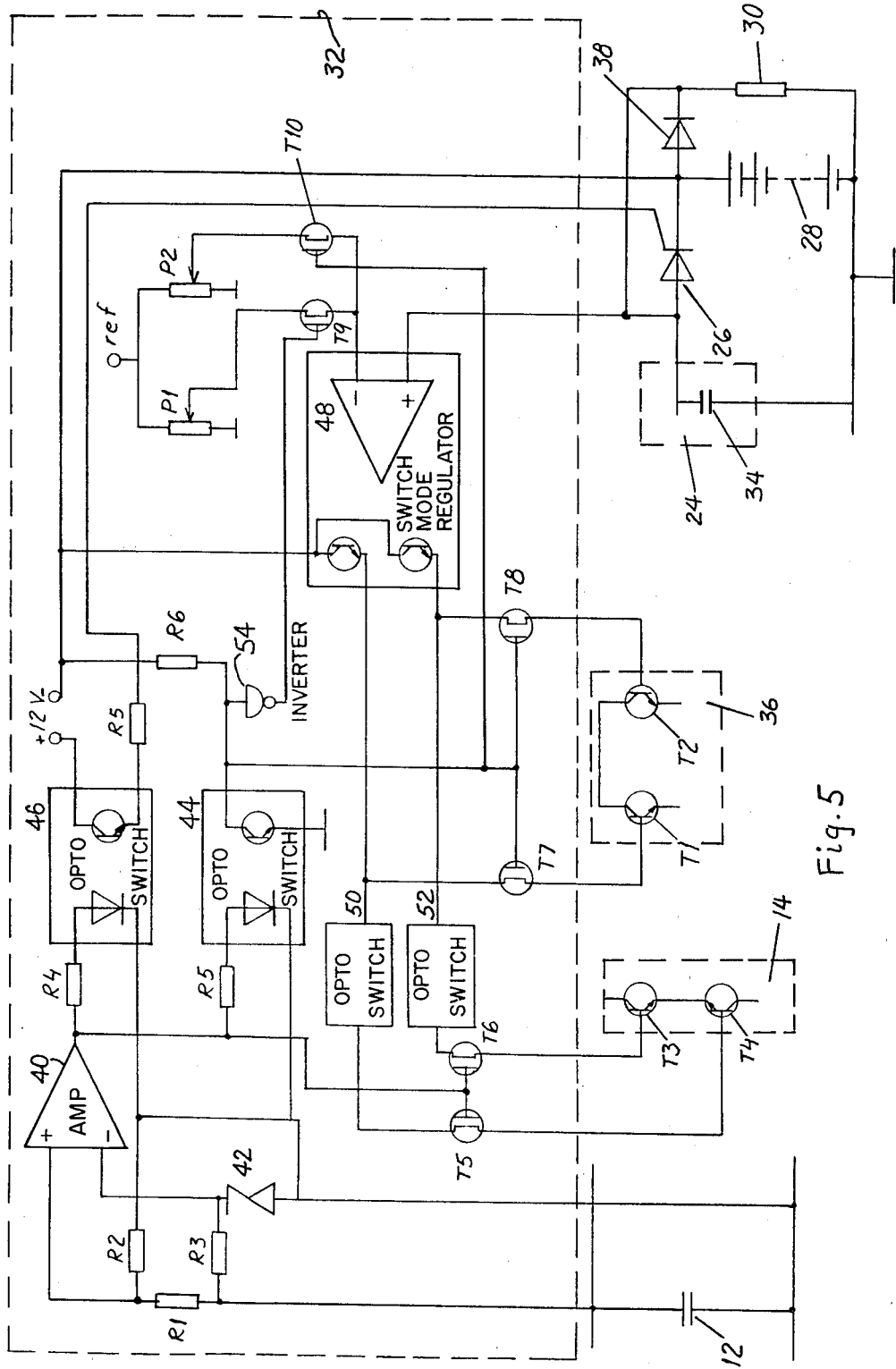
FIG. 5 is a circuit diagram of a suitable control unit for use in the installation of the present invention.

As to the control unit 32, various drives for regulating flow, at proper voltage from a main source to a load and battery charger, when there is sufficient main voltage; and, on the other hand from the battery to the load, when the main voltage is insufficient are well known in the art, and use can be made of such units. FIG. 5, wherein the components 12, 14 T1–T4, 26, 28, 30 and 38 are the same as shown in FIG. 3 is illustrative of such a control unit.

The control unit 32 in one mode, regulates the voltage to the load 30 such, that the voltage is kept within given values and indicates whether a current interruption has occured and in such a case acts in a second mode to disconnect the battery from the battery charger and connect the battery to the secondary side of the transformer, whereby the current can be supplied to the load. The control unit further regulates the transformation of the battery voltage to a voltage, correct for the load.

In the first mode when a sufficient main voltage is at hand, the voltage over the capacitor 12 then is sufficient to give the positive input of an operation amplifier 40 a voltage, higher than the voltage supplied from a zener diode 42 connected to the negative input of the amplifier. The output of amplifier 40 thus is high, causing two opto switches 44 and 46 connected to the output of the amplifier to be activated. This causes the thyristor 26 to have a current applied to its gate and thus be conductive.

A switch-mode regulator 48 and attached components, function to compare the output voltage from the rectifier 10 with a reference and to generate a pulse train at its output to control the current to the transformer 16 such, that a constant output voltage from the rectifier is achieved. Details of such a switch-mode regulator circuit can be found for instance in Motorola, Application Report, "Switch-mode Regulator Control Circuit" No. Ds 9424 1977.

As the opto switch 46 is activated a voltage is applied to the bases of a pair analogue gates T7 and T8 which voltage is low, resulting in the choking of transistors T1 and T2 of the switch 36. A second set of analogue gates T5 and T6, connected to the square wave generator 14 however, are open due to the high voltage on the output of the amplifier 40. Thus signals from the output transistors of the switch mode regulator 48 pass through a second set of opto switches 50 and 52 through transistors T5 and T6 to the transistors T3 and T4, of the square wave generator 14.

When the opto switch 44 is activated an inverter 54 connected to it has a high voltage on its output, thus opening another analogue gate T9 and connecting one input of the switch-mode regulator 48 to a reference signal from a potentiometer P1. The other input the switch mode regulator 48 is connected to the load 30. A further analogue gate T10 is blocked as the control voltage to its base is low. Thus the rectifier is switched as a common switch mode rectifier.

On the other hand, should the voltage from the rectifier 12 decrease due to insufficient mains voltage from the rectifier 10, than at a level, given by resistances R1, R2 and the zener voltage over diode 42 the amplifier 40 reverses so that its output will be low. The opto switches 44 and 46 will not be activated and thus the gaste current to thyristor 26 ceases and the thyristor 26 stops being conductive and the charging of the battery ceases. The analogue gates T5, T6, and T9 are then blocked whereas gates T7, T8 and T10 are opened.

The rectifier 10 now operates as a DC voltage converter where the battery voltage via the transistors T1 and T2 is transformed to a higher voltage in the secondary winding 20 (FIG. 3) of the transformer and is applied to the load 30 via the direct connection between the anode of the thryistor 26 and the load. The reference voltage to the switch mode regulator 48 is now received from a potentiometer P2 which may be adjusted to the voltage being most favorable to the load.

When the main voltage returns to the proper levels the amplifier 40 is reversed and the analogue gates T5–T10 reverse and the rectifier reverts to operate as a common switch mode rectifier.

An apparatus in accordance with the invention thus functions in the following way. When sufficient ingoing AC voltage is available, the switch 36 is non-conducting and the switch 26 conducting. If the square wave generator 14 comprises two transistors, these operate now in a push-pull circuit. The appartus now operates as a primary-switched charging unit. When the DC voltage over the capacitor in the filter 12 falls below a certain predetermined value, the generator 14 is blocked, and the switch 26 will be non-conducting, as a result of the control voltage being zeroed and also by the charging current ceasing, due to the lowered operating voltage. The battery now takes over carrying the load, possibly via a diode 38. When the battery has dropped to a given lower limit, the square wave generator 36 is started with the battery voltage as operating voltage. The chopped voltage is transformed up in the secondary winding of the transformer to a voltage required for the load. The battery voltage continues to drop while the control unit 32 regulates the output voltage to a constant value via the switch 36. The diode 38 will be blocked and the load is fed directly from the transformed and filtered voltage at point 34 in the FIGS. 2, 3 and 4. When the AC voltage is once again normal, the apparatus returns to normal operation according to the above.

The inventive concept is thus to increase the battery voltage by means of DC voltage converter during discharge, so that a greater portion of the stored battery energy is made available. During interruption of the ordinary AC voltage to the charger, a portion of the charger transformer is utilized as a voltage increaser and regulator with feed from the battery. A simple and cheap regulating means is hereby obtained.

What is claimed is:

1. A method of uninterruptedly maintaining a current supply to a load normally supplied from a main source comprising the steps of providing a battery, charging said battery via a charger comprising a primary switched rectifier and a charging transformer through which said main source is supplied when the voltage from the main source is available to a sufficient extent to provide on the secondary winding of said charging transformer an operating voltage for said load and a charging voltage for said battery and automatically disconnecting the battery from the charging voltage of the secondary winding upon a voltage drop or voltage interruption from the main source and supplying the load with voltage from the battery, the battery voltage being chopped into square wave form and transformed up via the secondary winding of the charging transformer to the voltage required for the load.

2. The method according to claim 1, including the step of placing a diode between the battery and load, said diode being so arranged that the battery voltage acts directly on the load during an interruption in the operating voltage, as long as the battery voltage is higher or equal to the voltage required for the load.

3. A current supply installation for uninterruptedly maintaining a current supply to a load normally supplied from a main source comprising a battery, a charger connected to said main source for charging said battery, said charger comprising a rectifier for a fed-in operating voltage, a smoothing filter, a square wave generator for chopping the rectified and smoothed operating voltage to square wave form, a charging transformer for retransforming the voltage and supplying from the secondary winding a charging voltage suitable for charging the battery and carrying a load, a second rectifier for removing the square wave form on the charging voltage from the charging transformer, a filter for filtering said charging voltage, a first switch for connecting and disconnecting the charging voltage to the battery and an output for carrying the load, a control unit sensing the operating voltage and the voltage across the load for regulating the square wave generator, a second switch interposed bvetween the battery and the secondary winding of the charging transformer operable on disconnection of said first switch for feeding the battery voltage back to the secondary winding of the charging transformer for transformation to the voltage required by the load during a voltage drop or rupture in the operating voltage.

4. The installation according to claim 3, wherein said second switch comprises a square wave generator connected between the battery and the secondary winding of the charging transformer.

5. The installation according to claim 3, wherein a diode is connected between the battery and the output to the load.

* * * * *